(No Model.)
J. A. STEININGER.
BRAKE CYLINDER PRESSURE GRADUATING AND MAINTAINING TRIPLE VALVE.
No. 517,895. Patented Apr. 10, 1894.
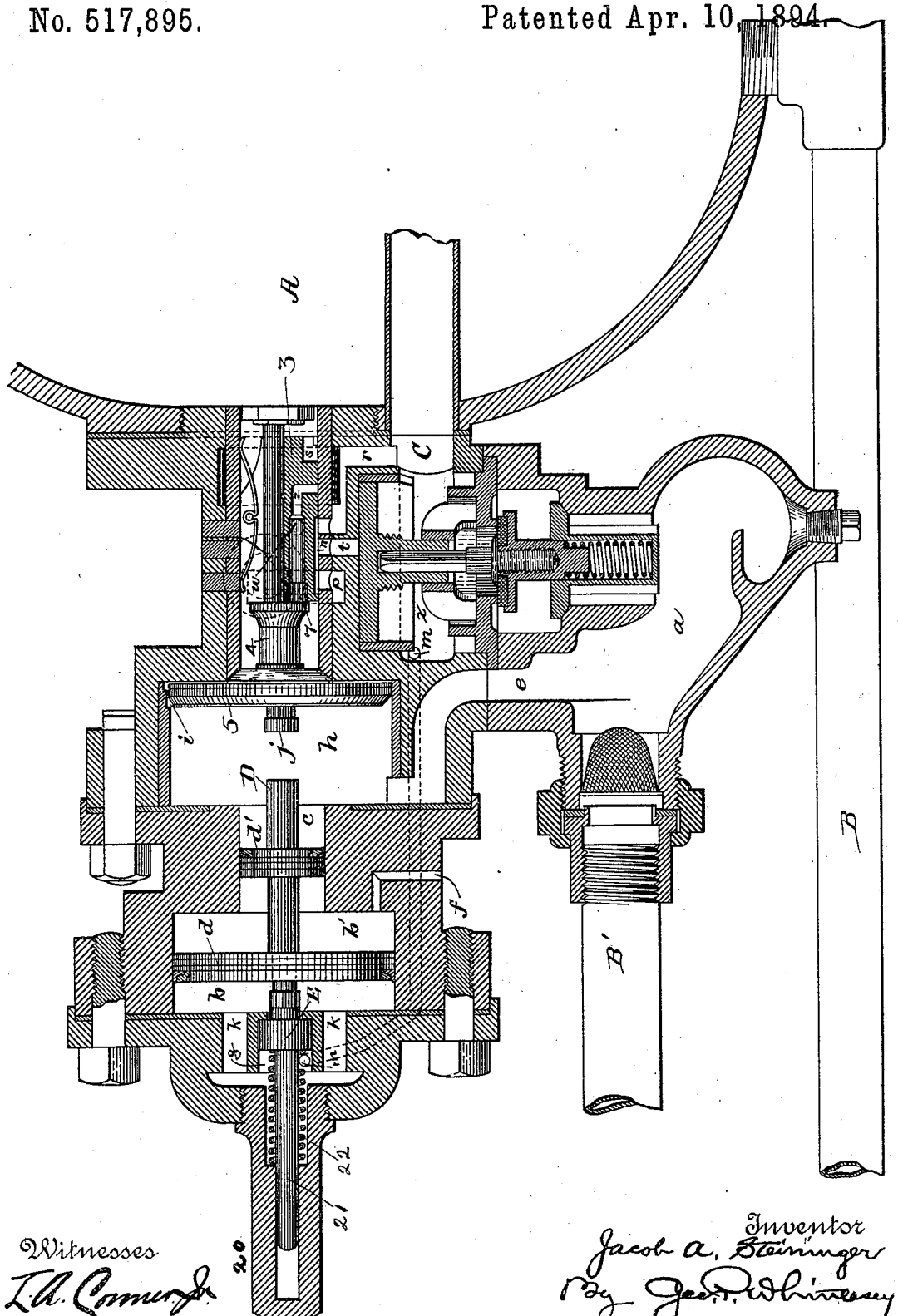
Witnesses
L. A. Conner
Fred L. Fishback
Inventor
Jacob A. Steininger
By Geo. P. Whitney
Attorney

UNITED STATES PATENT OFFICE.

JACOB A. STEININGER, OF CRESTON, IOWA.

BRAKE-CYLINDER PRESSURE GRADUATING AND MAINTAINING TRIPLE VALVE.

SPECIFICATION forming part of Letters Patent No. 517,895, dated April 10, 1894.

Application filed December 13, 1893. Serial No. 493,568. (No model.)

*To all whom it may concern:*

Be it known that I, JACOB A. STEININGER, a citizen of the United States, residing at Creston, in the county of Union and State of Iowa, have invented certain new and useful Improvements in Brake-Cylinder Pressure Graduating and Maintaining Triple Valves; and I do declare the following to be a full, clear, and exact description of the invention, such as will enable others skilled in the art to which it appertains to make and use the same, reference being had to the accompanying drawing, and to the letters and figures of reference marked thereon, which forms a part of this specification.

My invention relates to fluid pressure air brake systems, and its object is to prevent the brakes from "leaking off," when it is necessary to keep them continuously applied for a considerable time.

Incidentally, also, the invention aims to prevent the engineer from "losing his air," by obviating the necessity for frequent applications of the brake.

The invention consists in an improved triple valve, in which the new features are additional to those of the ordinary quick action Westinghouse valve, so that they can be readily incorporated in existing systems, The drawing is a sectional elevation of my improved valve.

The auxiliary reservoir A is preferably made considerably larger than is now the custom, so as to give a greater body of air to draw on, or, in lieu of this, a second train pipe B may be provided, connected directly with the auxiliary through a suitable check valve, in order to keep up the pressure in said reservoir. I prefer, however, to use the larger reservoir.

The train pipe B', chamber $a$, passage $e$, chamber $h$, piston 5, knob $j$, port $i$, piston-rod 4, slide valve 3, valve 7, ports $s$, $w$, $z$, $n$, $t$, $r$, $p$, chamber $x$, passage C, and the pistons and valves of the quick action movement, are all those usually found in the Westinghouse triple valve, and need not be described at length. These parts are shown in the position they occupy when the brakes are released, the train pipe being in communication with the auxiliary reservoir through the port $i$.

In carrying out my improvements, I arrange in line with the knob $j$ and rod 4, a stem D on which are secured two pistons $d$ $d'$, the former considerably larger than the latter, and each moving in a cylindrical chamber $b$ $c$. The smaller chamber $c$ forms a passage between chamber $b$ and chamber $h$, and the space $b'$ between the pistons communicates with the atmosphere, as by passage $f$. In line with the stem D is the graduating stem or plunger 21, sliding in its socket 20, and pressed outward therefrom by the helical spring 22. On its end it carries a piston valve E, sliding in a cylinder $g$, which communicates with chamber $b$ by ports $k$. A passage $m$ runs from the chamber $x$ to the cylinder $g$, into which it opens behind the piston E when the latter stands in its normal position, as shown. The stem D normally abuts against the plunger 21, so that when a service stop is made, the travel of the piston 5 is arrested, as usual, by the knob $j$ striking the end of the stem. So, too, when an emergency stop is made, the spring 22 serves to close the slide valve 3 again, as in the ordinary quick action triple valve.

When a service stop is made, the valve 7 holds the air in the brake cylinder, by closing the port $w$ as soon as the reservoir pressure has become reduced below that in the chamber $h$. Now, if there is a leak in the brake cylinder or its connections, the brakes will leak off, and another reduction in the train pipe pressure will be necessary to set them again. Moreover, it usually takes only a few successive applications of the brakes to reduce the auxiliary reservoir pressure to so low a point that it will not be sufficient to hold the train. Before going down long hills it is the duty of the brakemen to turn the retaining valve on each car, which controls the exhaust port $p$ and retains a pressure of fifteen pounds per square inch in the brake cylinder, while the engineer recharges the auxiliary reservoir so as to be able to apply the brakes again with more force. This puts the control of the train partly into the hands of the brakemen, while it should be entirely under the control of the engineer.

By my above described additions to the triple valve, I give the engineer complete control of the brake system.

When the parts stand as shown in the drawing, the train pipe, chamber $h$ and auxiliary reservoir are charged to the normal pressure of seventy pounds. There is no pressure in the chambers $b\ b'$, $g$, and the stem D is kept pressed against the stem 21 by the pressure on the small piston $d'$. Upon reducing the pressure in the train pipe in the usual manner, the piston 5 moves to the left until the knob $j$ strikes the stem D, allowing the air in the reservoir to pass into the brake cylinder by way of passage $r$ and chamber $x$, as usual. The pressure also passes by passage $m$ into cylinder $g$ and chamber $b$, and when it has reached a point high enough to enable the large piston $d$ to move the stem D against the still higher pressure on the small piston $d'$, the stem will be forced to the right, carrying before it the piston 5 and positively seating the graduating valve 7, a result which does not occur in the usual triple valve until the pressure in the auxiliary reservoir has equalized with that in the train pipe. With my invention, the valve 7, is positively closed as soon as the pressure on piston $d$ and on one side of piston 5 overcomes that on piston $d'$ and the other side of piston 5. Now if there should be a leak in the brake cylinder, or its connections, the pressure on the large piston $d$ will be reduced because chamber $b$ is in communication with the brake cylinder by passage $m$. The pressure remaining in the reservoir would then, acting upon the piston 5, move all the pistons to the left, positively opening valve 7 and again renewing the pressure in the brake cylinder. This action of the valve will continue automatically, so long as the pressure in the train pipe and chamber $h$ is kept below that in the auxiliary reservoir.

It will be noticed that the pressure in the brake cylinder depends not upon the amount of reduction of train pipe pressure but upon the proportions of the pistons 5, $d$, $d'$. If the area of piston 5 equals sixteen square inches; the area of piston $d'$, two square inches, and the area of piston $d$, twelve square inches, then the pressure in the brake cylinder, for every reduction in the train pipe and chamber $h$ will be as follows:

| Reservoir Pressure. | Train Pipe. | Brake Cylinder. |
|---|---|---|
| 70 | 65 | 17.5 |
| 70 | 60 | 23.3 |
| 70 | 50 | 35. |
| 70 | 40 | 46.6 |
| 70 | 30 | 58.3 |
| 70 | 20 | 70. |

It thus appears that a gradual reduction of fifty pounds in the train pipe pressure will set the brakes with the full auxiliary reservoir pressure on the brake cylinder piston.

To set the brakes at once with the full auxiliary reservoir pressure, a sudden reduction of ten or twelve pounds is made in the train pipe, causing the reservoir pressure to force the piston 5, stem D and plunger 21 as far as they will go to the left. This movement of the pistons and stems brings into play the quick action parts of the valve, admitting the fluid train pipe pressure directly into the brake cylinder in the usual manner. The piston valve E closes the passage $m$, preventing the pressure in the brake cylinder from having access to the large piston $d$, and thus rendering inoperative the automatic action of the pistons which occurs when a slight reduction of train pipe pressure is made, as fully described above.

It will be thus seen that I enable the engineer to keep the brakes set at a constant pressure during a long period, as when running down a long grade, without the use of retaining valves and without any danger of "losing his air," while the usual operation of the quick action parts of the triple valve is not in any way interfered with. It will also be seen that since the brake cylinder pressure bears a fixed ratio to the train pipe pressure and is governed solely by the relative sizes of the pistons, the pressure in all the brake cylinders on the train will be the same, irrespective of the travel of the brake piston. This gives a uniform braking effect on all the cars, which is a great advantage. With the system in common use, the pressure in the brake cylinder varies with the travel of the brake piston, being greater on the pistons which have the shorter travel.

For the sake of simplicity I have shown and described the moving abutments for the air as pistons, but it will be of course understood that I may use diaphragms or flexible disks, such being well known equivalents of pistons in this art.

Having thus described my invention, what I claim is—

1. The combination with a triple valve, of a stem in line with the piston 5 thereof, and adapted to arrest the outward movement of said piston, and a movable abutment attached to said stem and exposed to the pressure in the brake cylinder, whereby a predetermined pressure in said brake cylinder will cause said abutment to give the piston 5 a return movement, substantially as described.

2. The combination with a triple valve, of a stem in line with the piston 5 thereof, and two movable abutments of different areas attached to said stem, the smaller one being exposed to the train pipe pressure, and the larger one to the brake cylinder pressure, substantially as described.

3. The combination with a triple valve, of a stem in line with the piston 5 thereof, and two movable abutments of different areas attached to said stem, the smaller one being in a chamber communicating with chamber $h$ of the valve, and the larger one being in a chamber communicating with the brake cylinder connections of the valve, substantially as described.

4. The combination with a triple valve, of a stem in line with the piston 5 thereof, a movable abutment attached to said stem and inclosed in a chamber communicating with the brake cylinder, a spring actuated plunger abutting said stem, and a valve on said plunger adapted to cut off the communication between said chamber and brake cylinder, substantially as described.

5. The combination with a triple valve, of the stem D carrying the abutments $d$ $d'$, located in the chambers $b$, $c$, and the spring plunger 21, having the piston valve E moving in a cylinder $g$, and adapted to close the end of a passage $m$ leading from the chamber $b$ to the chamber $x$ of the triple valve, substantially as described.

6. The combination with a triple valve, of a movable abutment in line with the piston 5 thereof, and exposed normally to the pressure in the brake cylinder, and means for cutting off said pressure by the excessive movement of the piston 5 when an emergency stop is made, substantially as described.

In testimony whereof I affix my signature in presence of two witnesses.

JACOB A. STEININGER.

Witnesses:
 FRED. J. SPIES,
 JOHN BURNS.